United States Patent [19]

Nakada

[11] Patent Number: 4,553,562
[45] Date of Patent: Nov. 19, 1985

[54] RESIN-MOLDED VALVE AND METHOD OF MAKING THE SAME

[75] Inventor: Morihito Nakada, Namerikawa, Japan

[73] Assignee: Toyo Kako Kabushiki Kaisha, Toyama, Japan

[21] Appl. No.: 545,403

[22] Filed: Oct. 25, 1983

[30] Foreign Application Priority Data

May 4, 1983 [JP] Japan ................... 58-78647

[51] Int. Cl.$^4$ ............................................. F16K 5/06
[52] U.S. Cl. ..................... 137/375; 251/315; 251/366
[58] Field of Search ............ 251/315, 316, 317, 309, 251/312, 305, 306, 307, 308, 366; 137/375

[56] References Cited

U.S. PATENT DOCUMENTS

| | | | |
|---|---|---|---|
| 3,550,902 | 12/1970 | Pidgeon | 251/315 |
| 4,172,583 | 10/1979 | Wrasman | 251/366 |
| 4,241,897 | 12/1980 | Maezawa | 251/306 |
| 4,257,575 | 3/1981 | Runyan | 251/309 |
| 4,348,006 | 9/1982 | Schmitt et al. | 251/306 |

FOREIGN PATENT DOCUMENTS

| | | |
|---|---|---|
| 44-27111 | 11/1969 | Japan . |
| 53-6375 | 3/1978 | Japan . |
| 53-9949 | 3/1978 | Japan . |
| 53-9950 | 3/1978 | Japan . |
| 53-23539 | 7/1978 | Japan . |
| 55-10789 | 4/1979 | Japan . |
| 54-35872 | 10/1979 | Japan . |
| 55-12619 | 3/1980 | Japan . |
| 55-12622 | 3/1980 | Japan . |
| 55-31348 | 8/1980 | Japan . |
| 56-144873 | 10/1981 | Japan . |
| 56-48754 | 11/1981 | Japan . |

Primary Examiner—Martin P. Schwadron
Assistant Examiner—James R. Shay
Attorney, Agent, or Firm—Flynn, Thiel, Boutell & Tanis

[57] ABSTRACT

A valve molded entirely of resin includes a valve body having an inner housing, a housing cap fitted in the inner housing, a valve element such as a ball, and a stem coupled to the valve element and actuatable to move the latter for providing selective communication between ports in the inner housing and the housing cap. The valve body is covered with a frame molded of resin and substantially covering the exterior surface of the valve body.

13 Claims, 12 Drawing Figures

RESIN-MOLDED VALVE AND METHOD OF MAKING THE SAME

FIELD OF THE INVENTION

The present invention relates to a valve molded entirely of resin and a method of making the same.

BACKGROUND OF THE INVENTION

Valves having parts made of resin are advantageous in that they can be mass-produced by injection molding, are resistant to corrosion, and inexpensive to construct.

One attempt to provide an increased mechanical strength to the body of such a valve has been to increase the thickness of the molded valve parts. However, thick valve parts cannot easily be molded, and their mechanical strength has proven unsatisfactory. When assembling valves, it is necessary to fasten seal rings, gaskets and other parts under a prescribed load. Prior resin-molded valves include a holder ring for reinforcing and holding a resin housing, and a reinforcement metal cover for protecting the resin housing against external shocks and internal fastening stresses. The valves may additionally have a valve cover for pressing and holding an inner valve body or a seal ring, the valve cover being fastened in position by a plurality of fasteners (mostly of metal) such as fastening bolts.

The prior resin-molded valves, therefore, require separate members made of metal in most cases for increasing the mechanical strength of the valve parts and fastening them under a prescribed load. These additional components have been an obstacle to efforts to achieve a reduction in the production cost and a full degree of corrosion resistance.

SUMMARY OF THE INVENTION

It is an object of the present invention to provide a resin-molded valve which is made up of a reduced number of parts, has a high degree of corrosion resistance and mechanical strength, and can be mass-produced efficiently at a greatly reduced cost.

Another object of the present invention is to provide a method of manufacturing valves by molding valve parts of resin in a mold assembly and simultaneously assembling the valve parts therein.

According to the present invention, a frame is molded of resin over a valve body and substantially covers the external surface thereof. The valve body is composed of molded parts such as an inner housing, a housing cap fitted in the inner housing, a valve element such as a ball, and a stem coupled to the valve element and actuatable to move the latter for providing selective communication between ports in the inner housing and the housing cap. For the molding operation, the valve body components are first assembled together and inserted in a mold cavity, and then the frame is molded over the valve body, whereupon the valve body is completely assembled by the molded frame. Since the valve of the invention is constructed of molded parts which are assembled together while they are being molded, no separate fastening parts are necessary, and no additional step of fastening the valve components together is required.

The above and other objects, features and advantages of the present invention will become more apparent from the following description when taken in conjunction with the accompanying drawings in which a preferred embodiment of the present invention is shown by way of illustrative example.

DESCRIPTION OF THE PREFERRED EMBODIMENT

Figure 1:
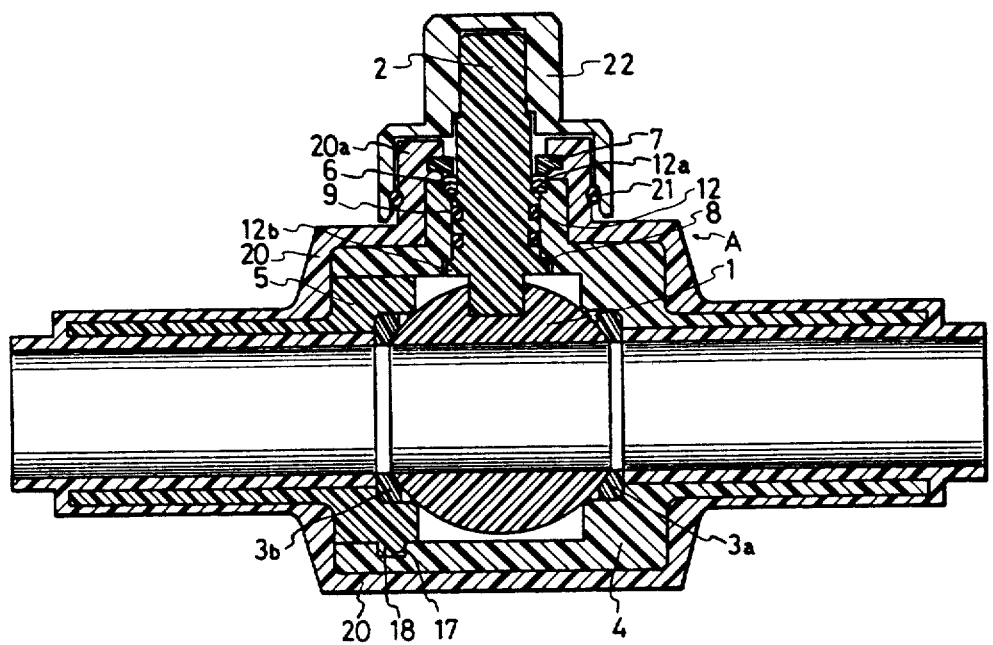
FIG. 1 is a longitudinal cross-sectional view of a ball valve according to the present invention.

As shown in FIG. 1, a valve A according to the present invention comprises a valve element or ball 1 made of resin, a drive shaft or stem 2 made of resin and coupled to the ball 1 for turning the ball 1 through 90° to shut off a fluid flow or control a flow rate, seat rings 3a, 3b made of resin and held against the ball 1 for preventing any fluid flow when the ball 1 is in the shutoff position, an inner housing 4 of resin in which the ball 1 is rotatably disposed, and a housing cap 5 of resin partly fitted in the inner housing 4 and retaining the ball 1 in the inner housing 4.

Figure 2C:
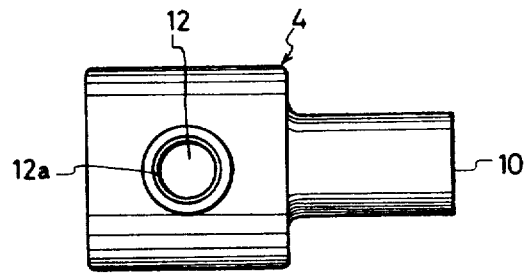
FIG. 2(c) is a plan view of the inner housing of FIG. 2(a)
Figures 2A, 2B:
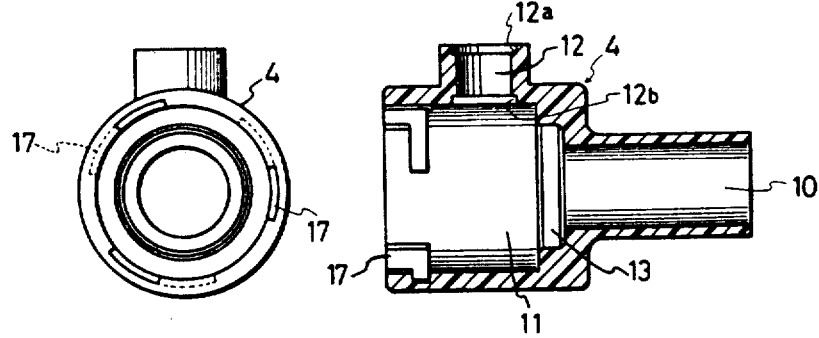
FIG. 2(a) is a longitudinal cross-sectional view of an inner housing of the valve.
FIG. 2(b) is a side elevational view of the inner housing shown in FIG. 2(a)

As illustrated in FIGS. 2(a) through 2(c), the inner housing 4 has an outer end port 10, an inner cavity 11 accommodating the ball 1 therein, a boss 12 through which the stem 2 extends, and a recess 13 defined between the outer end port 10 and the inner cavity 11 and receiving therein one of the seat rings 3a. The inner housing 4 also has a plurality of angularly spaced locking recesses 17 defined in an end wall surface of the inner cavity 11 remotely from the recess 13. As shown in FIG. 1, a gland packing 6 is disposed in a recess 12a in the boss 12 and retained therein by a packing holder 7. A thrust washer 8 is located in another recess 12b defined in the boss 12. The gland packing 6, the packing holder 7, and the thrust washer 8 are made of resin. A pair of O-rings 9 made of synthetic rubber are placed in the boss 12 around the stem 2.

Figure 3:
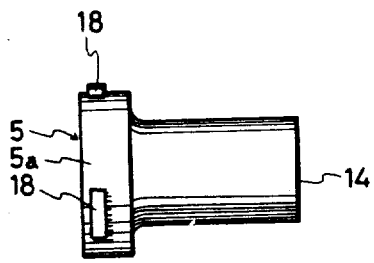
FIG. 3(a) is a longitudinal cross-sectional view of a housing cap of the valve.
FIG. 3(b) is a side elevational view of the housing cap shown in FIG. 3(a)
FIG. 3(c) is a plan view of the housing of FIG. 3(a)
Figure 3B:
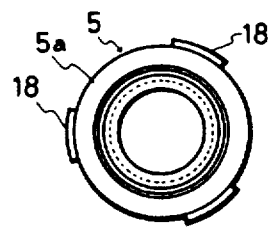
Figure 3:
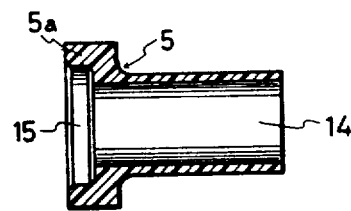

The housing cap 5 is illustrated in FIGS. 3(a) through 3(c), and has an outer end port 14 and an inner recess 15 formed remotely from the outer end port 14 and receiving the other seat ring 3b. The housing cap 5 includes a circular flange 5a fitted closely in the cavity 11 in the inner housing 4 and having a plurality of angularly spaced locking teeth 18 received respectively in the locking recesses 17 in the inner housing 4.

Figure 5:
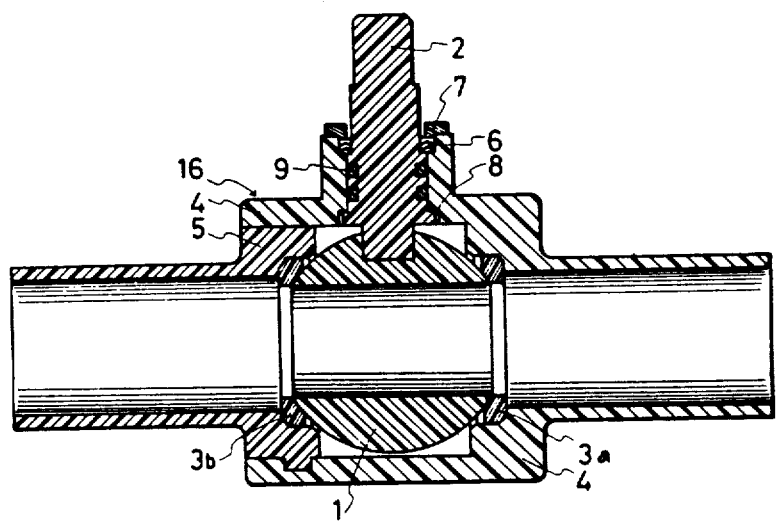
FIG. 5 is a longitudinal cross-sectional view of a tentatively assembled valve body.

The ball 1, the inner housing 4, the housing cap 5, the stem 2, and the other associated parts are tentatively assembled into a valve body 16 as shown in FIG. 5. The assembled valve body 16 has a peripheral or exterior surface which is almost entirely composed of the peripheral or exterior surfaces of the inner housing 4 and the housing cap 5.

Figure 4:
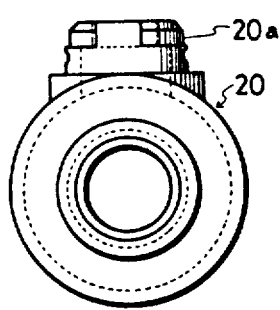
FIG. 4(a) is a longitudinal cross-sectional view of a valve frame.
FIG. 4(b) is a side elevational view of the valve frame illustrated in FIG. 4(a)
FIG. 4(c) is a plan view of the valve frame of FIG. 4(a)
Figure 4:
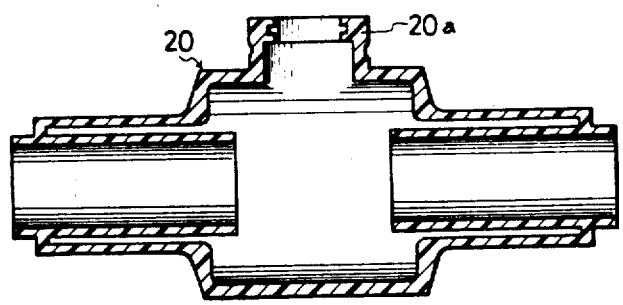
Figure 4C:
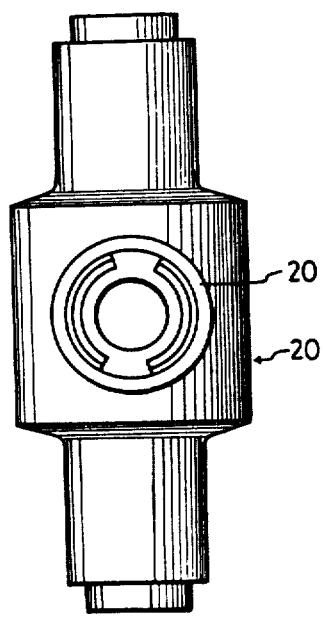

As shown in FIG. 1, the assembled valve body 16 is covered with a cover or frame 20 molded of resin. The frame 20 is of a shape complementary to the profile of the valve body 16 as illustrated in FIGS. 4(a) through 4(c), and has end surfaces pressed against the seat rings 3a, 3b and the packing holder 7.

The valve according to the present invention is composed of the valve body 16 and the frame 20 fitted thereover. The frame 20 has a central sleeve 20a over which a head cap 22 is fitted with an O-ring 21 of synthetic rubber being interposed therebetween.

The valve of the foregoing construction is manufactured in the following manner:

The ball 1, the stem 2, the inner housing 4, the housing cap 5, the packing holder 7, and the head cap 22 are individually injection-molded of a suitable resin material. The seat rings 3a, 3b, the gland packing 6, the thrust washer 8, and the O-rings 9, 21 are also separately fabricated.

Figure 6:
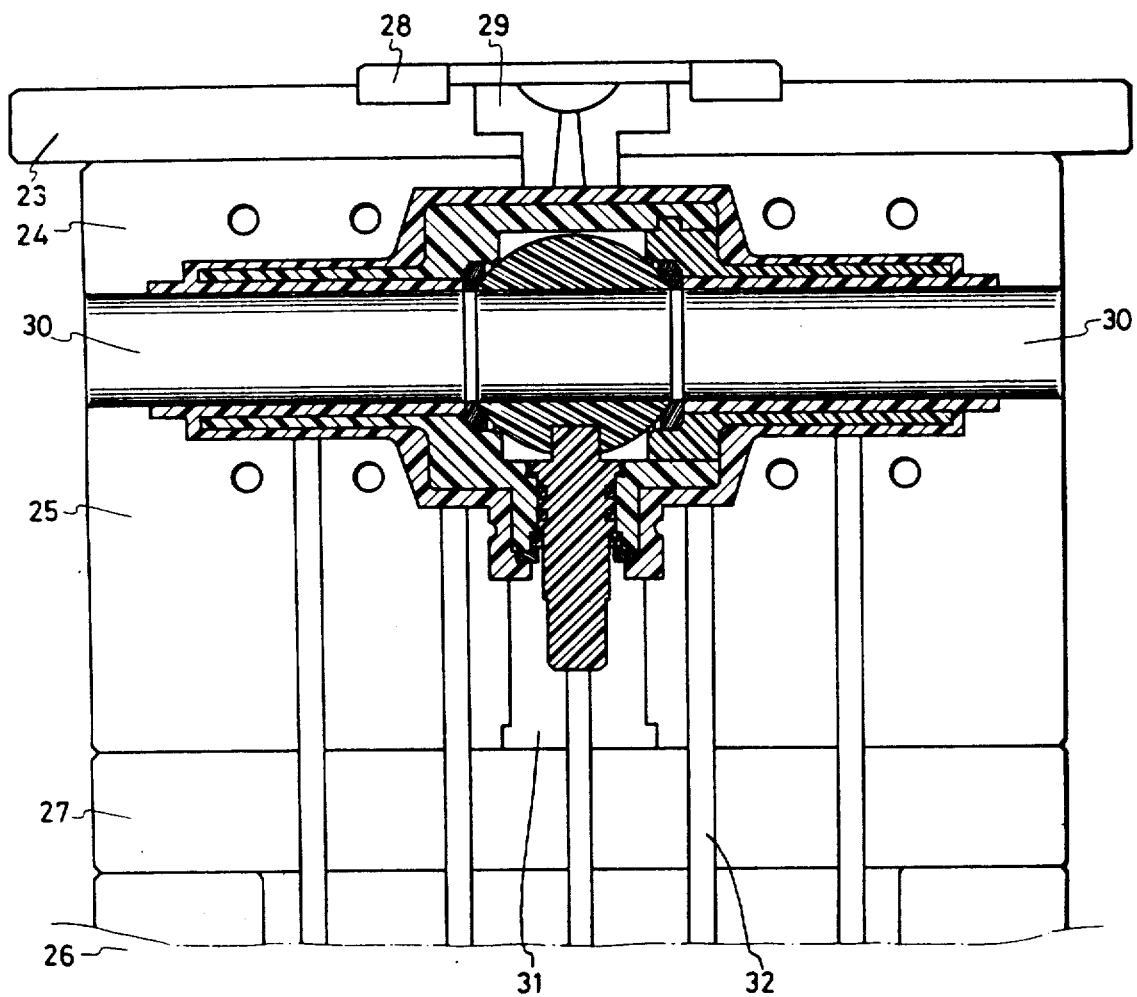
FIG. 6 is a view showing a mold assembly for molding the valve according to the present invention.

The foregoing components except the head cap 22 and the O-ring 21 are tentatively assembled into the valve body 16, which is then inserted into a cavity in a mold assembly, as shown in FIG. 6, for molding the frame 20.

In FIG. 6, the mold assembly is composed of a fixed attachment plate 23, a fixed mold plate 24, a movable mold plate 25, a movable attachment plate 26, a bearing plate 27, a locating ring 28, a sprue bushing 29, a slidable insert 30 which is a cylindrical rod having a diameter less than the inside diameters of the ports 10 and 14 and substantially equal to the inside diameters of the openings through the seats 3a and 3b and the ball 1, a core insert 31, and ejector pins 32. A suitable resin material is then injected into the cavity in the mold in which the valve body 16 is placed, for molding the frame 20 integrally around the valve body 16 under molding pressure and due to resin properties. At the same time, the seat rings 3a, 3b and the packing holder 7 are firmly held in position under holding pressure, so that the valve body 16 is completely assembled at the same time that the frame 20 is molded.

Thereafter, the mold frame 20 with the valve body 16 fitted therein is removed from the mold assembly, and the head cap 22 with the O ring 21 placed there is mounted on the sleeve 20a of the frame 20. The valve illustrated in FIG. 1 is now completed.

With the valve constructed of the present invention, the frame 20 is securely fitted over the inner housing 4 and the housing cap 5 and serves to reinforce them for an increased mechanical strength. Particularly, the frame 20 provides added rigidly to the inner housing 4 and the housing cap 5 to prevent them from being deformed when their ports 10, 14 are subjected to fastening stresses at the time they are coupled to external pipes and also to protect them against external shocks.

According to the method of the invention, the frame 20 is integrally injection-molded around the valve body 16, which has been tentatively assembled and placed in the mold assembly. Upon injection-molding of the frame 20, the seat rings 3a, 3b and the packing holder 7 are fastened under a suitable force due to molding pressure, and the valve body 16 is thus completely assembled within the mold assembly.

Therefore, the valve of the invention requires no holding ring, no metal cover, no ball cover, and no fastening bolts which have been essential components of conventional resin-molded valves, and hence needs no operation for fastening such parts. The valve can be constructed of a reduced number of parts, is completely assembled while the components are being molded, and can be mass-produced efficiently through a reduced number of manufacturing steps at a reduced cost. The valve with its parts molded together is of an increased degree of mechnical strength. Since all of the valve parts are of molded resin, the valve is highly resistant to corrosion.

Although a certain signal preferred embodiment has been shown and described, it should be understood that many changes and modifications may be made therein without departing from the scope of the appended claims. For example, the present invention is equally applicable to other valve types than ball valves, such as needle valves or butterfly valves, for example.

What is claimed is:

1. A valve, comprising:
a preassembled valve body of resin, including an inner housing having a fist port therein and having a cavity therein which is in fluid communication with said first port, a housing cap having a portion lockingly held in said cavity in said inner housing and having a second port therein which is in fluid communication with said cavity in said inner housing, a valve element movably supported in said cavity so as to permit adjustment of the degree of fluid communication between said first and second ports, and a driving stem which extends through an opening in said inner housing and is coupled to said valve element for effecting movement thereof; and
a cover of resin provided over said preassembled valve body so as to substantially cover exterior surfaces of said inner housing and said housing cap.

2. The valve according to claim 1, wherein said inner housing has a boss thereon through which said opening for said driving stem extends, said cover having a sleeve portion provied over said boss.

3. The valve according to claim 2, including an annular gland packing provided in said opening in said inner housing in the region of said boss and extending around said driving stem, and including a packing holder which is supported outside of said boss by said sleeve portion of said cover and which retains said gland packing within said boss.

4. The valve according to claim 1, including a pair of seats which engages said valve element and are each disposed between said valve element and a respective one of said inner housing and said housing cap, and wherein said cover has edge portions which are disposed in said first and second ports and engage said seats on a side thereof opposite said valve element.

5. The valve according to claim 1, wherein said valve element is generally spherical.

6. The valve according to claim 5, wherein said valve body includes a pair of annular seats which each slidably and sealingly engage said valve element and which are each disposed between said valve element and a respective one of said inner housing and said housing cap, and wherein said cover has integral portions which are tubular, which each extend into a respective one of said first and second ports, and which each have an inner end which engages a respective one of said seats on a side thereof opposite said valve element.

7. The valve according to claim 6, wherein said portion of said housing cap has a generally cylindrical outer surface and is disposed in a portion of said cavity having a generally cylindrical inner surface, wherein said inner housing has a plurality of L-shaped locking recesses provided in said cylindrical surface in said cavity, and wherein said housing cap as a plurality of locking teeth projecting outwardly from said cylindrical surface thereon, each said locking tooth being received in a respective said locking recess.

8. The valve according to claim 7, including an annular seal which encircles said sleeve portion of said cover, and including a head cap which is supported on said driving stem so as to be fixed against rotation with respect thereto and which has a portion which encircles said sleeve portion of said cover and slidably sealingly engages said seal on said sleeve portion.

9. The valve according to claim 8, including a further annular seal which encircles said drive stem and slidably sealingly engages on inner surface of said opening in said inner housing.

10. A method of making a valve, comprising the steps of:
preassembling a valve body which is made of resin, said valve body including an inner housing having a first port therein and having therein a cavity which is in fluid communication with said first port, a housing cap having a portion lockingly fitted in said cavity in said inner housing and having a second port therein which is in fluid communication with said cavity in said inner housing, a valve element movably supported in said cavity so as to perit adjustment of the degree of fluid communication between said first and second ports, and a driving stem which extends through an opening in said inner housing and is coupled to said valve element for effecting movement thereof; and
thereafter molding a cover of resin over said valve body so as to substantially cover exterior surfaces of said inner housing and said housing cap.

11. The method according to claim 10, wherein said valve body is completely assembled when said cover is molded thereover.

12. The method according to claim 10, wherein said preassembling step includes the step of providing two annular seals in said cavity which each engage said valve element, and wherein said step of molding said cover over said valve body includes the step of molding integral portions on said cover which are tubular, which each extend into a respective one of said first and second ports in said valve body, and which each have an inner end which engages a respective one of said annular seals.

13. The method according to claim 12, wherein said valve element is a ball having an opening therethrough; wherein said step of molding said cover over said valve body includes the step of first placing said preassembled valve body in a mold cavity having a cylindrical rod extending therethrough, said cylindrical rod extending through and having a diameter substantially equal to the inside diameters of said seats and said ball, and said cylindrical rod extending through and having a diameter less than the inside diameter of said first and second ports; and wherein said molding step includes, after said step of placing said valve body in said mold cavity, the step of injecting a predetermined quantity of moldable synthetic resin into said mold cavity.

* * * * *

UNITED STATES PATENT AND TRADEMARK OFFICE
CERTIFICATE OF CORRECTION

PATENT NO. : 4 553 562

DATED : November 19, 1985

INVENTOR(S) : Morihito NAKADA

It is certified that error appears in the above-identified patent and that said Letters Patent is hereby corrected as shown below:

Column 4, line 24; change "fist" to ---first---.

Column 5, line 7; change "as" to ---has---.

Signed and Sealed this

Fifteenth Day of April 1986

[SEAL]

Attest:

DONALD J. QUIGG

Attesting Officer  Commissioner of Patents and Trademarks